United States Patent [19]

Roovers

[11] Patent Number: 5,662,541

[45] Date of Patent: Sep. 2, 1997

[54] TRANSMISSION WITH FIXED TRANSMISSION RATIO

[75] Inventor: Gijsbertus Cornelis Franciscus Roovers, Goirle, Netherlands

[73] Assignee: Van Doorne's Transmissie B.V., Tilburg, Netherlands

[21] Appl. No.: 619,136

[22] Filed: Mar. 20, 1996

Related U.S. Application Data

[63] Continuation of Ser. No. 416,933, Apr. 4, 1995, abandoned.

[30] Foreign Application Priority Data

Apr. 13, 1994 [NL] Netherlands .......................... 94 00586

[51] Int. Cl.$^6$ ...................................................... F16H 7/00
[52] U.S. Cl. .......................... 474/149; 474/153; 474/160; 474/161; 474/205
[58] Field of Search ..................................... 474/148, 152, 474/153, 160, 161, 202, 204, 205, 149

[56] References Cited

U.S. PATENT DOCUMENTS

| | | | |
|---|---|---|---|
| 2,718,790 | 9/1955 | Hughey | 74/229 |
| 3,504,562 | 4/1970 | Hirych | 474/162 X |
| 3,597,985 | 8/1971 | Jeffrey | . |
| 4,047,444 | 9/1977 | Jeffrey | 74/229 |
| 4,147,069 | 4/1979 | Derner | 474/204 X |
| 4,589,860 | 5/1986 | Brandenstein et al. | 474/152 X |
| 4,715,845 | 12/1987 | Nagashima | 474/152 |
| 5,037,359 | 8/1991 | Koster et al. | 474/148 |

FOREIGN PATENT DOCUMENTS

| | | |
|---|---|---|
| 0 405 667 | 1/1991 | European Pat. Off. . |
| 2089985 | 1/1972 | France . |
| 1 112 362 | 8/1961 | Germany . |
| 94 03 404 | 6/1994 | Germany . |

*Primary Examiner*—Roger J. Schoeppel
*Attorney, Agent, or Firm*—Young & Thompson

[57] ABSTRACT

A transmission with a fixed transmission ratio comprises a pliable endless member which is provided with a profile of mainly transversely oriented teeth, and at least two pulleys which are each provided, on their circumferential surface, with recesses which mate with the teeth. The pliable member is a flexible belt which is stiff in its longitudinal direction and which may be made of metal, for example.

16 Claims, 5 Drawing Sheets

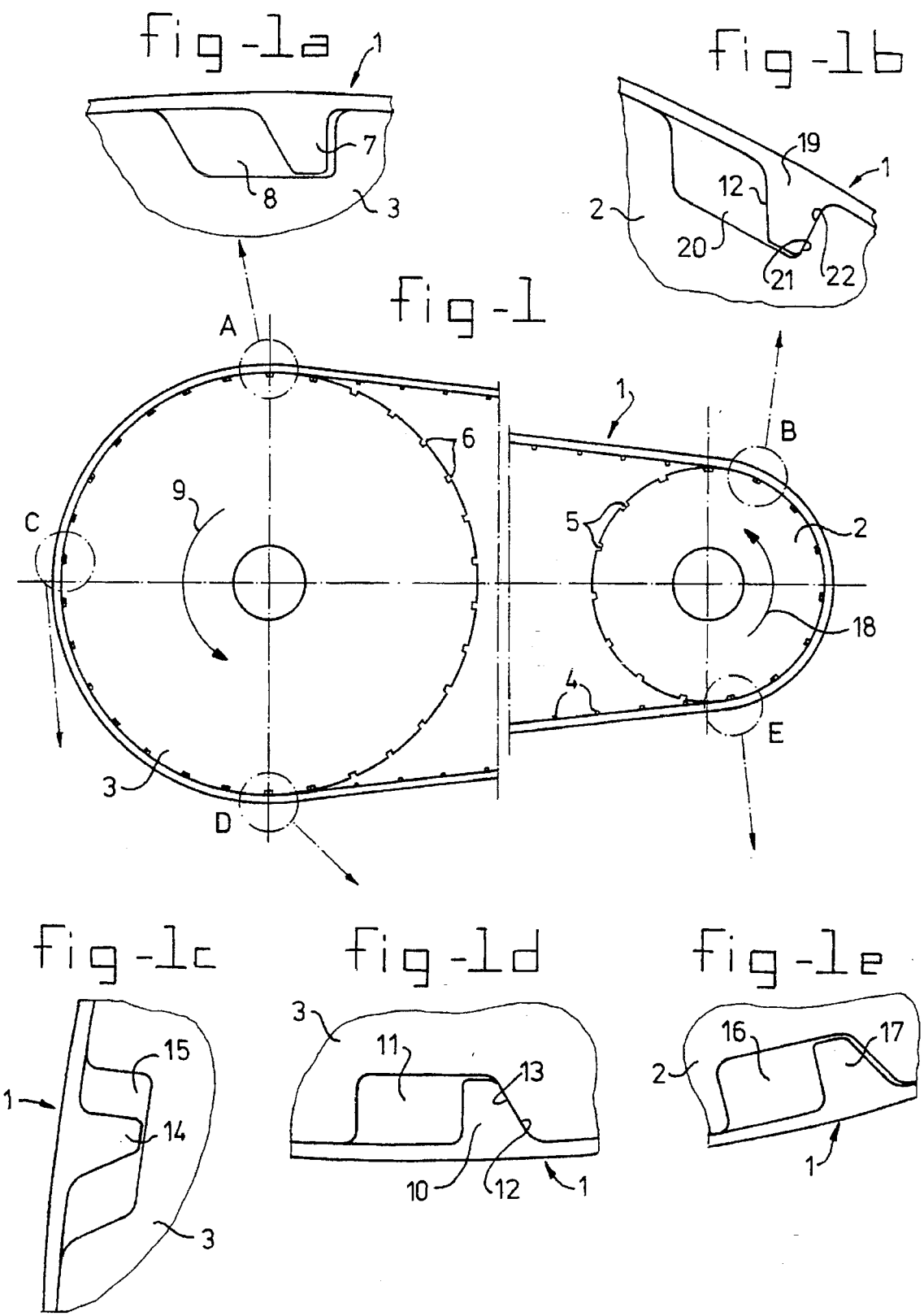

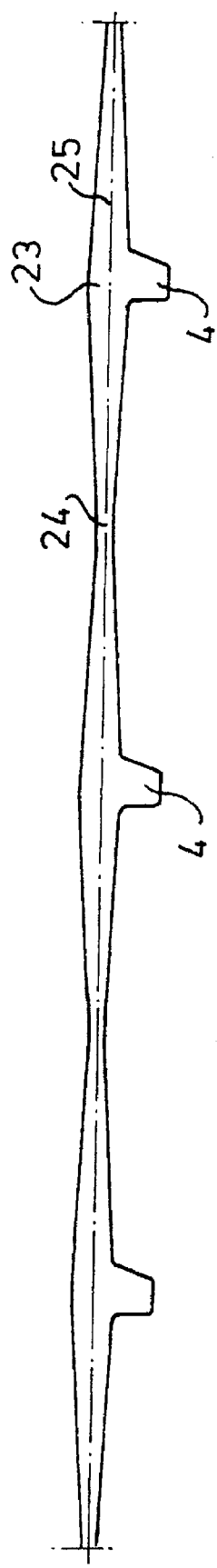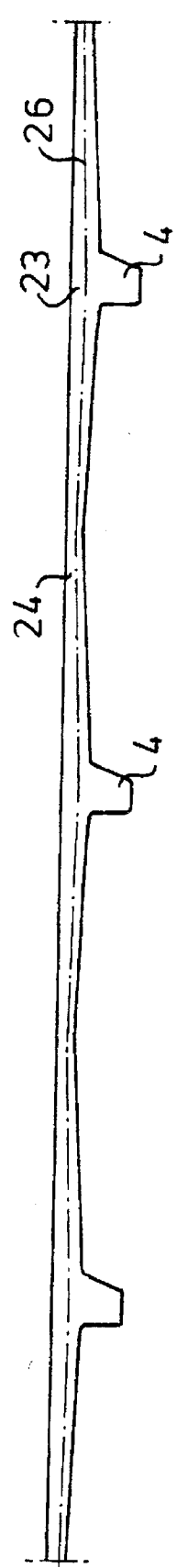

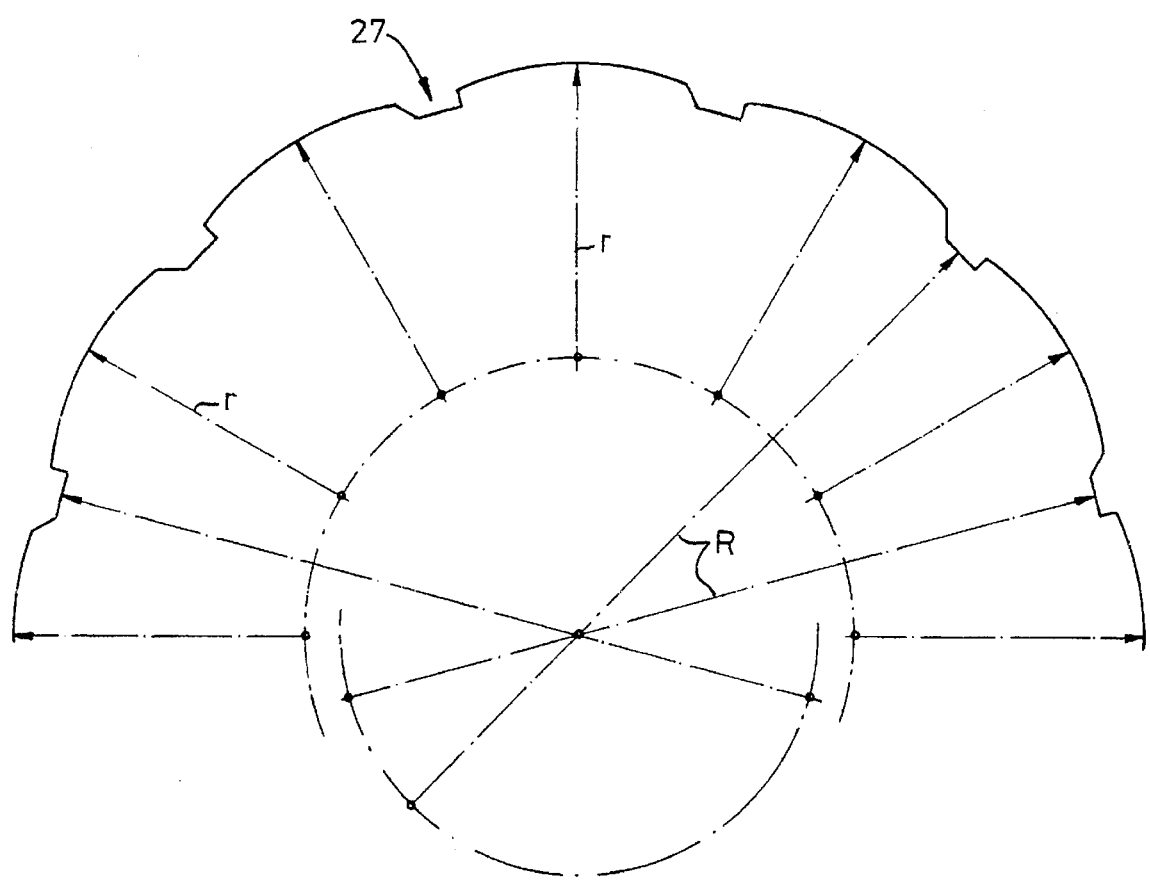

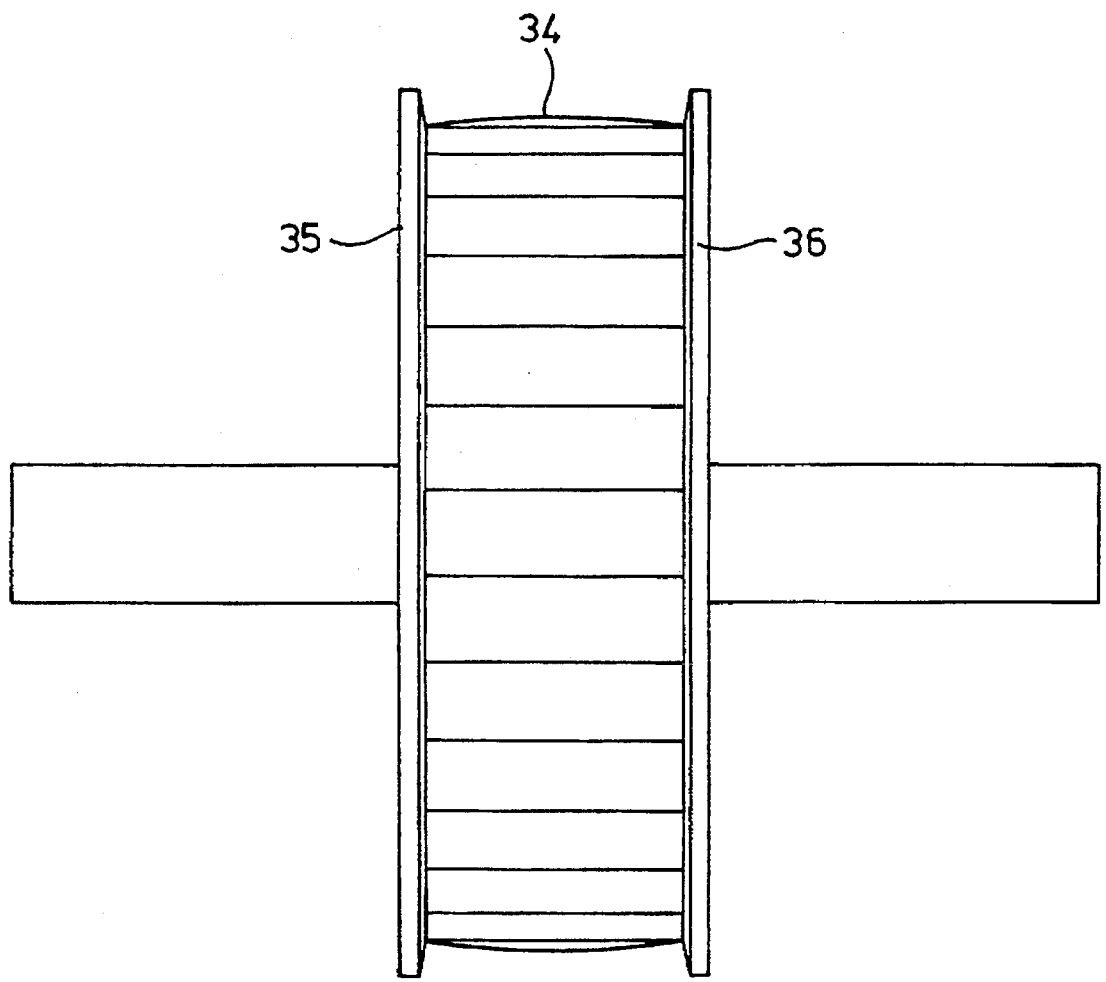

TRANSMISSION WITH FIXED TRANSMISSION RATIO

This application is a continuation of application Ser. No. 08/416,933, filed Apr. 4, 1995, now abandoned.

FIELD OF THE INVENTION

The invention relates to a transmission with a fixed transmission ratio, comprising a pliable endless member which is provided with a profile of mainly transversely oriented teeth, and at least two pulleys which are each provided, on their circumferential surface, with recesses which mate with the teeth.

BACKGROUND OF THE INVENTION

Such transmissions are generally known. Examples to be mentioned are the use in packaging machines, production machines and the like. In internal combustion engines, too, such a transmission is found between the crankshaft and the camshaft to operate the valves.

With the latter application, in particular, various designs are known, such as a chain with chain wheels or a plastic toothed belt with associated toothed wheels. All these known constructions have certain drawbacks, however.

Thus the cost price of a chain transmission is fairly high. In addition, the chain transmission has an uneven character, caused by the polygon effect which is associated with the pitch length of the chain links. Moreover, after some time wear occurs in the chain and as a consequence correct synchronization is lost.

Drawbacks of the plastic toothed belt are the poor synchronization and the short service life. Since it cannot be readily predicted when such toothed belts will fail, relatively short replacement periods must be observed.

SUMMARY OF THE INVENTION

The object of the invention is to provide a transmission which lacks these drawbacks. This object is achieved by the pliable member being a Flexible belt which is stiff in its longitudinal direction. Such a belt may, For example, be made of metal; the thickness of the belt is then preferably considerably smaller than its width. The teeth may be formed so as to be integral with the belt.

The advantage of a flexible metal belt is that no wear is possible therein, since only elastic deformations take place. Moreover, such a belt readily withstands high temperatures, For example those prevailing in an internal combustion engine. Consequently, a long service life can be guaranteed.

A further important advantage is that, given a limited width of the grooves in the pulleys, virtually no polygon effect arises, which makes it possible to ensure very smooth running. The synchronous action of the belt is, moreover, positively affected by its high degree of stiffness with respect to tensile forces. Because of the positive synchronization by means of the teeth and grooves mating and the high degree of stiffness of the belt, it is, moreover, possible to limit the pretension in the belt, low loads on shafts and bearings thus being achieved.

As mentioned earlier, the teeth on the belt mate with the grooves in the pulleys. To avoid said teeth and grooves having to meet unduly narrow tolerances, the thickness of the teeth, as seen in the driving direction, is preferably smaller than the width of the recesses. Thus it is possible to ensure that the run-in of the teeth into the grooves becomes insensitive to variations in the tooth pitch and in the pitch of the recesses.

In spite of this difference in the dimensions of teeth and grooves it is nevertheless possible to achieve exact synchronization of the pulley rotations, for the reasons set out below.

The belt is positioned around the pulleys with a certain pretension. This pretension can, for example, be adjusted by means of a tensioning mechanism which is known per se. Because of this pretension, the belt is able to transmit, by friction, a couple to the pulleys. In the applications intended for the present transmission, where the belt is generally in an oil-lubricated environment, the couple to be transmitted will, however, be considerably greater than this frictional couple. This means that the belt will slip until a flank of one of the teeth comes into contact with the facing flank of the groove in which that tooth is situated.

In connection therewith, the pitch of the recesses of the driving pulley is greater than the tooth pitch, and the pitch of the recesses of the driven pulley is smaller than the tooth pitch. For the driving pulley this means that the tooth just moving into a recess lands in the foremost part of the recess, as seen in the direction of revolution of the pulley. The tooth which, on the other side, is almost moving out of its recess is, however, in a position completely shifted to the rear, against the flank of the recess. This tooth and recess form the only pair whose flanks are in contact with each other and therefore it is only this pair which determines the position of the belt and the driving pulley with respect to each other.

It should further be borne in mind that, as said tooth moves out of its recess, the mating between said flanks is lost. At that instant, the belt slips to the rear over a tiny distance, this being the difference in the pitch of the belt and the driving pulley, as seen in the direction of revolution of the driving pulley, as a result of which the flanks of the next pair comprising a tooth and recess will mate. This tiny slip, which is possible because the driving couple is greater than the frictional couple, affects all the teeth, so that each tooth, when the foremost tooth disengages, is shifted slightly further backwards with respect to its recess.

In the case of the driven pulley and the belt, the reverse effect occurs. There, the tooth just moving into a recess lands in the rearmost portion of the latter, while said tooth, as it continues its path with the co-rotating pulley, is continually shifted slightly further forwards, each time the tooth moves out of its recess. Here, again, the position of the pulley with respect to the belt is determined solely by the single, foremost pair (i.e. the pair whose tooth is almost moving out of its recess) whose flanks are touching one another.

The belt may have a tapered thickness, such that at the position of each tooth the thickness is relatively large and in areas in between two teeth the thickness is relatively small. With such a design, the belt may be subjected to relatively pronounced bending, so that it is suitable for small pulleys without the stresses in the material in the belt becoming too high.

Preferably, the profile of the thickness of the belt is symmetric with respect to a centre plane of the belt. This causes the belt, over its straight section, to be pulled into a straight shape and unnecessary bending stresses are avoided.

The position of the teeth of the relatively thick portions of the belt has the advantage that the teeth can be supported effectively without the risk of their tilting under the influence of forces exerted thereon by the pulley, as a result of which the tilting forces are absorbed in the tooth-supported portion of the belt without the stresses in the material becoming excessively large.

Each tooth and recess may have an asymmetric cross-sectional shape, so that, as it moves into or out of the recess, the free tooth flank does not come into contact with the flank of the corresponding recess.

In order to prevent the transmission from starting to vibrate at its natural frequency as a result of the contact forces between teeth and recesses, each pulley may be provided with damping means to suppress vibrations which are generated by mating between teeth and recesses. An advantage of this design is also that, thanks to the resilient characteristics of the flanks of the recesses, a plurality of teeth simultaneously, for example two or three, can mate with the pulley in question. As a result, better transfer of force is obtained, while at the same time the engagement or disengagement of teeth and recesses can proceed more smoothly. Furthermore, reduced wear of teeth and recesses is thus possible, which affords a longer service life.

In that connection, one flank of each recess may be designed so as to be resilient. According to a practical embodiment, in this case two incisions are provided at the location of each cutout, one of which opens into the bottom of the cutout and the other at the periphery of the pulley in the vicinity of the cutout.

These incisions may run radially, while the incision opening at the periphery of the pulley may have a resilient element provided therein.

Further, each pulley may have alternating areas, in the circumferential direction, having a relatively high curvature and a relatively low curvature. In particular, the areas having a relatively high curvature are situated between two grooves each. This design is beneficial when a belt having a tapered thickness as described above is used. Those areas of the belt which have the smallest thickness are then situated at the location of those parts of the circumference of the pulley which have the smallest radius of curvature. The relatively thick parts of the belt, where a tooth is situated, need curve less, since they are situated at the location of those parts of the circumference which have a relatively large radius of curvature.

It should be noted that the transmission according to the invention can function both in an oil bath and in a dry environment.

BRIEF DESCRIPTION OF THE DRAWINGS

An illustrative embodiment of a transmission according to the invention will now be explained in more detail with reference to the figures.

FIG. 1 and 1a to 1e inclusive show a partial side-view, including details, of the transmission.

FIG. 2 shows a detail of a first embodiment of the belt which forms part of the transmission.

FIG. 3 shows a second embodiment of a belt.

FIG. 6 shows a view of a pulley.

DETAILED DESCRIPTION OF THE PREFERRED EMBODIMENTS

Figure 4A:
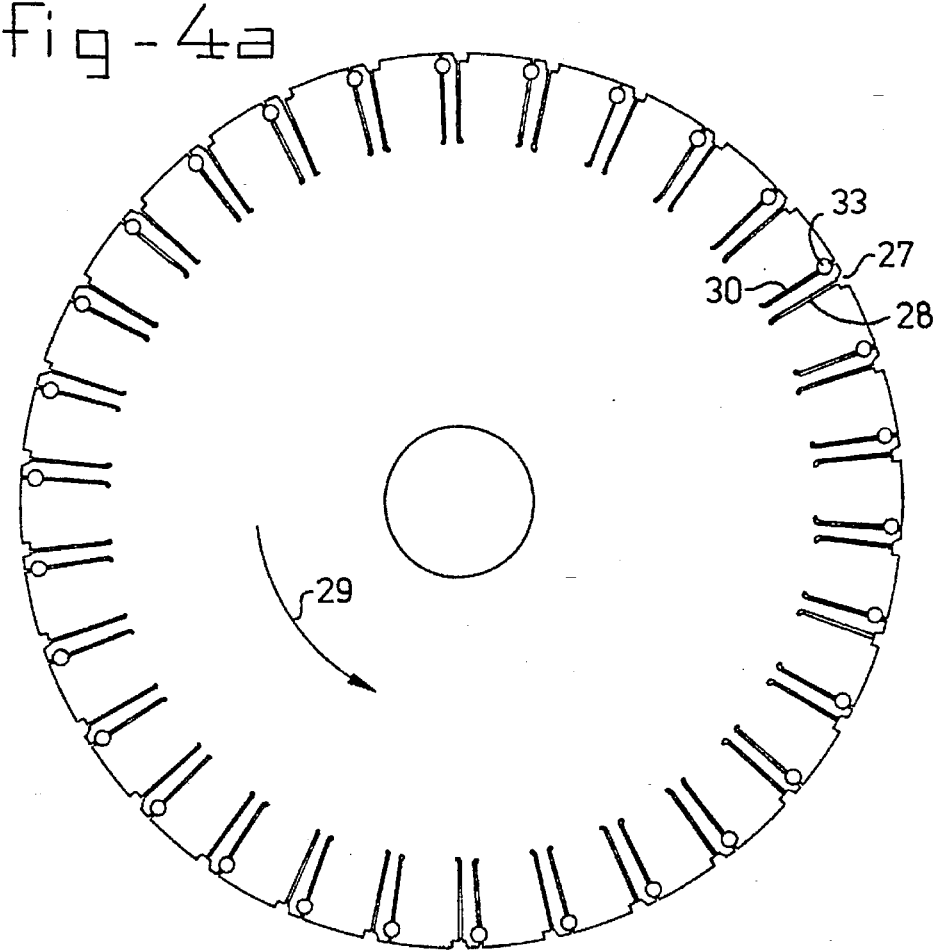
FIG. 4a, b shows a possible embodiment of a pulley.

The transmission depicted in FIG. 1 comprises a pliable metal belt 1, a driving pulley 2 and a driven pulley 3. This transmission may, for example, form the link between the crankshaft and the camshaft of an internal combustion engine.

The metal belt 1 is positioned round the pulleys 2 and 3 at a certain pretension. This pretension can be obtained, for example, by means of a pretensioning device (not shown) which is known per se and which, for example, is held in position so as to press against the outside of the non-pulling part of the belt 1. By means of this frictional mating between the pulleys 2, 3 and the belt 1 a frictional couple can be transmitted. This frictional couple is not sufficiently large, however, to provide the transmission between the pulleys 2, 3.

To achieve correct synchronization between the two pulleys 2 and 3, which is important, fop example, particularly in the case of the abovementioned use in an internal combustion engine, teeth 4 are employed on the belt 1, on the one hand, whilst, on the other hand, recesses are employed, in the pulleys 2 and 3, which take the form of transversely running grooves 5 and 6, respectively.

The pitch of the teeth 4 on the belt 1 is chosen in such a way that it is smaller than the pitch of the grooves 5 in the driving pulley 2, but greater than the pitch of the grooves 6 in the driven pulley 3. The result of this is that, in the case of a tooth 7 which has just moved into a groove 8 of the driven pulley 3, the tooth 7 is situated, in terms of the direction of revolution (as indicated by the arrow 9) of the driven pulley 3, in the rear of the groove 8. In this context, refer to detail A of FIG. 1 and to FIG. 1a.

On that side of the driven pulley 3, which is situated roughly diametrically opposite, in this context refer to detail D of FIG. 1 and to FIG. 1d, the tooth 10 has been pushed completely forwards in that direction into the corresponding groove 11. The flanks 12, 13 of tooth and groove, respectively, in this situation have mated. This pair comprising a tooth 10 and a groove 11 forms the only pair of the teeth and the grooves of belt 1 and driven pulley 3 which has mated. This tooth 10 and groove 11 are therefore responsible for the correct position of the belt 1 with respect to the driven pulley 3, in other words they afford the synchronizing action of said two parts.

When the driven pulley 3 has rotated slightly further, the tooth 10 leaves its groove 11, which results in the tooth situated behind it pushing forward, as seen in the direction of revolution 9, as a result of which it in turn comes to lie against the associated flank of the groove in which it is situated. In the process, the belt 1 in its entirety slips over the circumference of the driven pulley 3 and all the teeth 4 likewise slip over that distance in their corresponding groove.

The result of all these successive small slips is that the teeth 4 move continually further forward in their corresponding groove 5. In detail C of FIG. 1, and FIG. 1c, it can be seen that the tooth 14 has been pushed forward in the groove 15 over approximately half the width of the latter.

A corresponding effect arises in the driving pulley 2, except that a tooth 17, which has just entered the groove 16, of the belt i is now situated in a forward position in that groove 16, in terms of the direction of revolution (indicated by arrow 18) of pulley 2. On the diametrically approximately opposite side, the tooth 19 has been pushed completely backwards in its groove 20, as a result of which tooth flank 21 has come into contact with the rearmost groove flank 22. This pair comprising tooth 19 and groove 20 is the only one whose flanks have mated; said pair 19, 20 in fact provides the correct position of the belt 1 with respect to the driving pulley 2, in other words this pair provides the correct synchronization.

Here again it is the case that, as the foremost tooth 19, as seen in the direction of revolution 18, leaves its groove 20, the belt i slips with respect to the driving pulley 2, but now in a backward direction. In the process, the tooth and groove which subsequently act as the foremost pair come into contact with each other via their flanks.

In FIGS. 1a to 1e inclusive, in each case the foremost flank 12 of the teeth is positioned more obliquely than the rearmost flank 21. Such a shape has the advantage that the teeth, as they leave the groove of the driven pulley, no longer come into contact with the foremost groove flank 13 of the grooves 6 of the driven pulley 3.

FIG. 2 shows an illustrative embodiment of a belt provided with teeth 4. The belt has thickened portions 23 at the location of the teeth 4 and thinner portions 24 in the areas between the teeth 4. The advantage of this embodiment is that, on the one hand, the teeth 4 are supported effectively, in such a way that they cannot tilt under the influence of the driving forces, whilst, on the other hand, the belt has adequate flexibility thanks to the thinner portions 24.

In FIG. 2, the belt, with the exception of the teeth 4, is of symmetric design, which means that in the straight parts of the belt the neutral line 25 is a straight line, as a result of which unnecessary bending stresses are avoided.

The illustrative embodiment of FIG. 3 likewise shows a belt having teeth 4, thicker portions 23 and thinner portions 24. In this embodiment, the neutral line 26 in the right parts is not a straight line, however. In some cases it may be beneficial to choose a neutral line of this type, such a line, after all, having a straightening effect on the belt in the right parts under the tensile force. The teeth 4 may be disposed both on the straight side of the belt and on the side having the tapered thickness.

Figure 5:
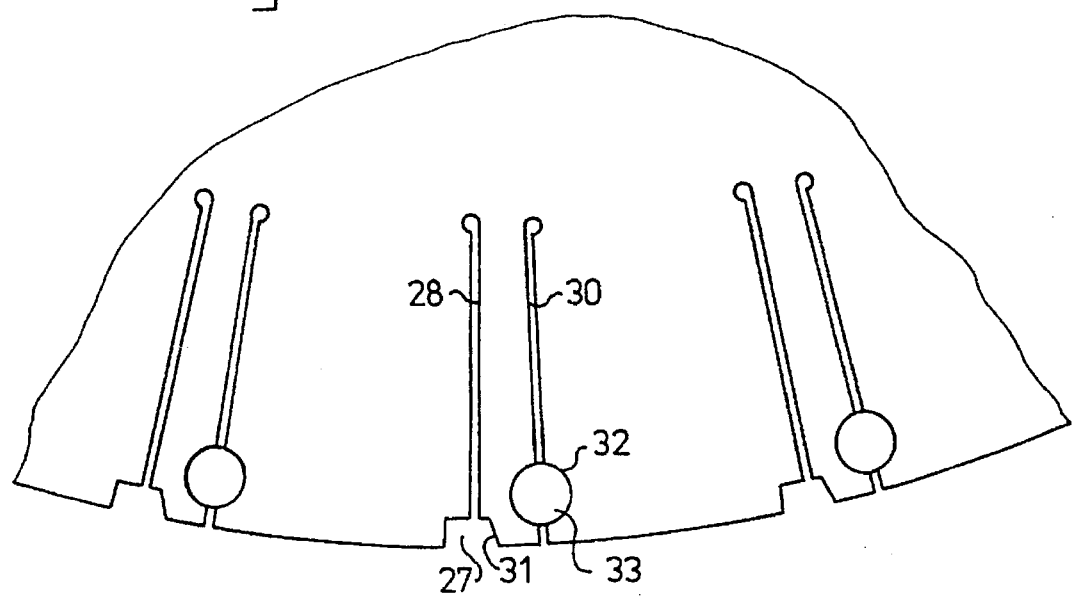
FIG. 5 shows a magnified detail of the pulley according to FIG. 4.

FIGS. 4 and 5 depict an example for a driven pulley having grooves 27, a radial incision 28 opening in the bottom of each groove. At some distance, in the direction of revolution 29 for the groove 27, a second radial incision 30 opens out. Both incisions 28, 30 cause the flank 31 of groove 27 to be elastically displaceable to a small extent, in the circumferential direction of the pulley. Such an elastic displaceability provides a damping effect for the contact forces which arise whenever a tooth flank 12 comes into contact with the groove flank 31, as can be seen, for example, in FIG. 1d.

FIG. 4b depicts an example of a pulley in which the pulley has alternating areas, in the circumferential direction, having a relatively small radius of curvature and a relatively large radius of curvature. In this arrangement, the areas having a relatively small radius of curvature are situated in each case between two recesses 27. As a result of the relatively thick portions of the belt, in which the teeth are situated, being situated at the location of those parts of the circumference which have a relatively large radius of curvature, they will bend less. If a belt having a tapered thickness, as described above, is used on such a pulley, this prevents the tensions in the material in the belt from rising to a high level.

The elastic displacement of tooth flank 31 can further be influenced by providing, in the incision 30, a circular enlargement 32 with an elastic member 33 therein.

In the view of FIG. 6 it can be seen that the circumference 34 of the pulley is curved in a radial plane. This curvature has the advantage that the belt centres itself on that circumferential surface. At the same time, guide flanges 35, 36 may be provided to prevent the belt from running off the pulley.

I claim:

1. In a transmission with a fixed transmission ratio, comprising a flexible endless belt which is stiff in its longitudinal direction and which is provided with a profile of mainly transversely oriented teeth having a tooth pitch, and at least a driving pulley and a driven pulley which are each provided, on their circumferential surface, with recesses which mate with the teeth; the improvement wherein the pitch of the recesses of the driving pulley is greater than the tooth pitch, and the pitch of the recesses of the driven pulley is smaller than the tooth pitch, the thickness of the teeth, as seen in the driving direction, being smaller than the width of the recesses, the belt slipping relative to both pulleys such that each tooth enters a forward portion of a recess on the driving pulley and leaves a rearward portion of that same recess on the driving pulley, whilst each tooth enters a rearward portion of a recess on the driven pulley and leaves a forward portion of that same recess on the driven pulley.

2. Transmission as claimed in claim 1, wherein said endless belt is metal.

3. Transmission according to claim 1, wherein the thickness of the belt is considerably smaller than its width.

4. Transmission according to claim 1, wherein the teeth are integral with the belt.

5. Transmission according to claim 1, wherein each tooth and recess have an asymmetric cross-sectional shape.

6. Transmission according to claim 5, wherein, as seen in the driving direction, the foremost and/or rearmost flank of each tooth is chamfered.

7. Transmission according to claim 1, wherein, as seen in the direction of belt movement, the forward surface of each tooth is inclined at a smaller angle to the belt than is the rear surface of each tooth.

8. Transmission according to claim 1, wherein the thickness of the belt tapers from a maximum thickness adjacent each tooth to a minimum thickness at a point midway between adjacent teeth.

9. Transmission according to claim 1, wherein each pulley is provided with damping means to suppress vibrations which are generated by mating between teeth and recesses.

10. Transmission according to claim 9, wherein one flank of each recess is designed so as to be resilient.

11. Transmission according to claim 10, wherein two incisions are provided at the location of each cutout, one of which opens into the bottom of the cutout and the other at the periphery of the pulley in the vicinity of the cutout.

12. Transmission according to claim 11, wherein the incisions run radially.

13. Transmission according to claim 11, wherein the incision opening out at the periphery of the pulley has a resilient element provided therein.

14. Transmission according to claim 9, wherein each pulley has alternating areas, in the circumferential direction, having a relatively high curvature and a relatively low curvature.

15. Transmission according to claim 14, wherein the areas having a relatively high curvature are situated between two grooves each.

16. Transmission according to claim 9, wherein the perimeter of each pulley has a convex curvature in a radial plane.

* * * * *